E. H. AMET.
APPARATUS FOR PRODUCING COMPANION AUDITORY AND VISUAL RECORDS FOR SIMULTANEOUS REPRODUCTION.
APPLICATION FILED APR. 21, 1913.
1,221,407.
Patented Apr. 3, 1917.
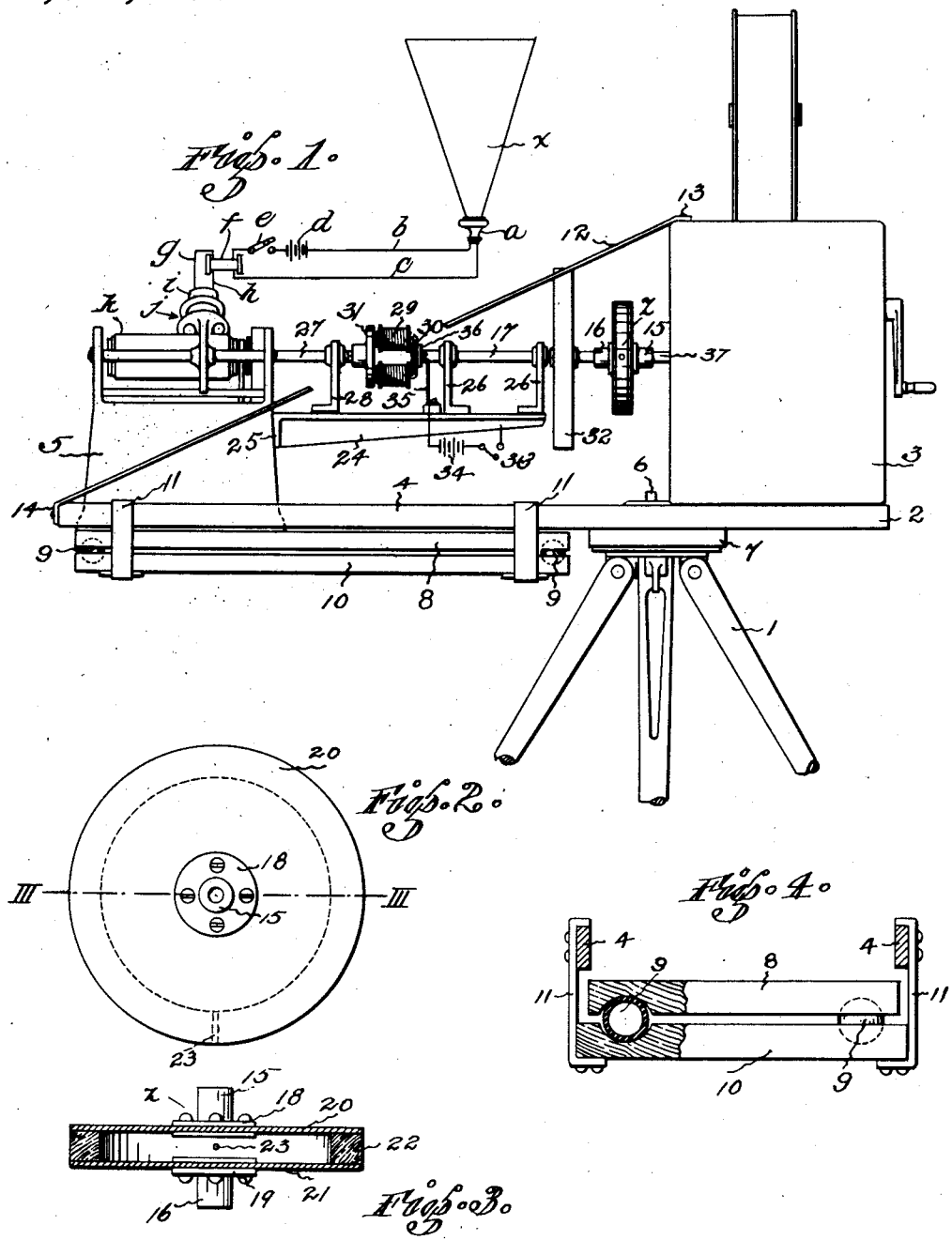
WITNESSES:
INVENTOR.
Edward H. Amet
BY
ATTORNEYS.

UNITED STATES PATENT OFFICE.

EDWARD H. AMET, OF REDONDO BEACH, CALIFORNIA.

APPARATUS FOR PRODUCING COMPANION AUDITORY AND VISUAL RECORDS FOR SIMULTANEOUS REPRODUCTION.

1,221,407. Specification of Letters Patent. Patented Apr. 3, 1917.

Original application filed December 22, 1912, Serial No. 738,809. Divided and this application filed April 21, 1913. Serial No. 762,553.

*To all whom it may concern:*

Be it known that I, EDWARD H. AMET, a citizen of the United States, and a resident of Redondo Beach, in the county of Los Angeles, State of California, have invented a new and useful Apparatus for Producing Companion Auditory and Visual Records for Simultaneous Reproduction, of which the following is a specification.

Attention is directed to my co-pending application filed Dec. 22, 1912, Serial No. 738,809, out of which application this application has been divided.

An object of this invention is to provide means whereby companion photographic and sound records may be so made that the reproduction of desired scenes with their accompanying sounds may be effected in a satisfactory manner.

In order to effect such satisfactory reproduction it is necessary that the sound and picture records shall be produced in unison, and that the sound record shall be kept free from markings produced otherwise than atmospherically.

The synchronous production of companion motion picture and sound records for the reproduction of motion pictures with sound accompaniment has long been sought, but in making such reproductions available to the public certain difficulties are encountered, some of the causes of which I will now point out, viz:

The sound collecting means must be sufficiently close to the motion picture subject to collect the sound accompanying the action. The motion picture machine and sound recording machine should be directly coupled to secure absolute synchronism in the simplest way, but the motion picture machine produces mechanical sounds which are apt to be made a part of the sound record and which would be objectionable in a reproduction of sounds to accompany the picture, and the direct coupling has heretofore proven unsatisfactory.

An object of this invention is to produce an apparatus in which the two record-making machines are directly coupled and which will effectively avoid all the difficulties involved and will enable the operator with perfect ease and freedom to secure synchronous companion records which can be successfully employed for reproducing without extraneous mechanical noises, the action and sound of the motion picture subject.

The motion picture machine should be movably mounted so as to bring the motion picture subject within the range of the camera. Such camera movement should be independent of the placement of the sound collecting means. The motion picture machine and the sound recording machine must operate with exact synchronism. Means for maintaining synchronism between the motion picture machine and the sound recording machine, when such machines are placed at any considerable distance apart, are necessarily extensive or intricate and require more or less personal attention for keeping the connecting apparatus, of electrical or other character, true. The motion picture machine and the sound recording machine must be close together in order to mechanically connect the two machines for synchronous operation. This I do by mounting the motion picture machine on a base having a hollow frame extension at its side and the sound recording machine on a base suspended in said hollow frame alongside of the other base and by making the picture machine base sufficiently movable to secure the required range for the camera, directly coupling the two machines together in alinement for synchronous action, providing means to effect said coupling and also providing non-vibration-transmitting mounting means for supporting the sound record machine on the suspended base; and actuating the sound recording machine telephonically by means of a sound collector in a telephonic circuit.

I regard this invention as pioneer in that I directly connect the driven shaft of a motion picture machine with the drive shaft of a phonographic machine by means of a non-vibration-transmitting coupling interposed between the ends of said shafts and provide a non-vibration-transmitting mounting interposed between the bodies of said machines to prevent the transmission to the recording stylus of mechanical vibration foreign to the desired phonographic record.

The invention possesses other advantageous features which, with the foregoing, will be set forth at length in the following description, where I shall outline in full that form of invention selected for illustration in the drawings accompanying and forming part of the present specification. The novelty of the invention will be included in the claims succeeding said description. From this it will be apparent that I do not restrict myself to the showing made by said drawings and description, as I may adopt many variations within the scope of my invention as expressed in said claims.

To insure definite uniformity in the speed of the respective machines, the most practical method is to mount thte phonograph record mandrel on an integral extension of the drive shaft of the motion picture camera. The essential disadvantage of this is the conductivity of the shaft, for vibratory sounds emanating from the camera and conducted to and absorbed by the phonograph record. After long and tedious experimenting, the novel shaft coupling herein disclosed, preferably consisting of a drumlike structure having the contiguous shaft ends attached to the leather heads of the drum, was evolved and found to perfectly isolate the phonographic record from all extraneous vibrations conducted by the camera shaft.

In the drawings:

Figure 1 is a view partly diagrammatic and partly in side elevation of apparatus constructed in accordance with this invention.

Fig. 2 is an end elevation of the non-vibration-transmitting shaft coupling interposed between the shafts of the motion picture machine and the sound recording machine.

Fig. 3 is a cross section of the same taken on the line III—III, Fig. 2.

Fig. 4 is an end elevation of the non-vibration-transmitting mounting for the sound recording machine partially in cross section to disclose the placing of the interposed balls.

The art of producing "talking pictures" calls for a working combination between the record making motion picture machine or camera and the sound recording machine. Vibration and noise is characteristic of the picture machine, while absolute silence in the mechanism of the sound recording machine is essential.

Near synchronism of the phonographic record accompanying a contemporaneous motion picture is not sufficient; they must be in absolute unison, and this is possible only when they are so made and so reproduced.

In detail the construction consists of the usual motion picture tripod 1, and of the portable outfit for making records, or any suitable table or foundation in the fixed or reproducing outfit. The base consists of a platform 2 to receive the camera 3, and has the side extensions 4 forming a hollow frame in which the sound recording machine 5 is hung. This base is revoluble in a horizontal plane around the vertical pivotal pin 6, fixed to the tripod head 7. The sound recording machine rests upon the support 8 which is mounted on non-vibration-transmitting means formed by hollow, spherical rubber balls 9.

The action of the hollow spherical balls 9 is peculiar, said balls being non-vibration-transmitting and having walls of even thickness. A solid ball will not accomplish the purpose of a hollow ball. A solid ball will polarize a vibration propagated on the subbase side and communicate it (to a certain extent deadened) to the sound recording machine support 8; whereas a hollow ball under the same circumstances will conduct the vibration circumferentially and lose it at the equator by lateral distortion, or some other undefinable physical effect. Since a sphere is the only body in which all points on its surface are at an equal distance from the center of the body, a point on the surface of a spherical body will resist the same pressure to the same degree as any other point on said surface. This applies also to the hollow spheres in which the walls are of even thickness. Thus, the balls serve the purpose of resisting in all directions the pressure that may be exerted upon them by jar or otherwise, so that the sound recording machine support 8 is thereby always held in a comparatively unchanging position within the frame.

The purr of the gears and the click of the intermittent feed of the picture machine, communicated to the driven shaft 37 and to the base 2, and the extensions 4, are intercepted and eliminated by the shaft coupling $z$ and by the cushioning balls 9 on the subbase 10, which, hung in the extension frame 4 by the brackets or hangers 11 and thereby insulated from the vibrations of the base, therefore coöperates with the balls to prevent sound vibrations from the camera from reaching the sound recording machine through said base. The frame is steadied by the strap 12 extending from the top of the camera at 13 to the frame at 14.

The sound-collector $x$ may be an ordinary phonograph horn and the same is connected to electrical transmitting means operated thereby and comprising a telephone transmitter circuit includnig the telephone transmatter $a$; the primary circuit, includnig the telephone transmitter wires $b$, $c$, battery $d$, switch $e$, the primary winding, not shown, of the induction coil $f$, the secondary winding, not shown, of said induction coil $f$, and the secondary circuit wires $g$, $h$ on the telephone receiver $i$; the same being operatably connected with the sound recording means $j$, $k$ of the sound recording machine 5.

The extension sleeve couplings 15 and 16 are respectively fixed to the ends of the drive shaft of the camera and the intermediate shaft 17. These sleeves are provided with the flanges 18 and 19, that are fixed to the heads 20 and 21, that are joined together by being fixed (preferably by adhesion) to the annular wooden or fiber ring 22. This drumlike structure is vented through the hole 23 to relieve any concussion due to end thrust from either of the joined shafts, or the heads may be open in spider like construction. The heads 20 and 21 are preferably of oil-impregnated flexible leather, or sheet rubber having sufficient tensile strength to transmit the power necessary for rotation without buckling or distortion. Having no sound conducting properties, the heads 21 and 20 isolate the respective machine shafts, and intercept any sound vibrations that might otherwise be transmitted from the motion picture drive shaft. The flexibility of this novel coupling also compensates for any disalinement of the joined shafts and acts as a "universal joint."

The extension arm 24 is attached to the side of the sound recording machine at 25. The pillar bearings 26 attached to this arm act as mountings for the shaft 17. This shaft is fixed in axial alinement with the mandrel shaft extension 27 of the phonograph, journaled in the out bearing 28 mounted on the arm 24.

The magnetic clutch comprises the magnets 29—29 fixed upon the core bar 30, that is fixed upon the end of the shaft 17, and the armature disk 31, that is slidably splined on the end of the extension shaft 27. It is the function of this clutch to instantly and positively set, to start the phonograph mandrel rotating at full speed when the clutch circuit is closed, as hereinafter described. The shaft 17 rotates constantly with the camera shaft. The relatively heavy fly wheel 32 fixed upon the shaft 17 has more than sufficient stored momentum at all times to overcome the inertia of the sound recording machine mechanism, to instantly start the same at full speed when the magnetic clutch locks.

The magnet clutch is operated by closing the switch 33 causing the current to pass from the battery 34, through the brush contact 35 bearing against a commutator 36, to which one end of the windings of the magnet coils is attached; the opposite end of the said windings is grounded on the shaft 17 through which the current flows back through the switch 33 to the battery, completing the circuit. The armature 31 is slidable on the squared end of the shaft 27 and is instantly engaged by the attraction of the magnets 29 to start the shaft 27 at full speed when the clutch is set.

By the interposition of the coupling in the shaft, and the vibration absorbing means between the base, the sound recording machine is completely isolated from any sounds or vibratory effects emanating from the picture machine and liable to be absorbed by the phonographic record.

The phonographic record may be made telephonically whereby the receiving horn $x$ may be located at a distance from the machine, sufficient to fail to record the operating noises of the motion picture machine.

Having thus described this invention, what I claim and desire to secure by Letters Patent is:

1. In combination with a motion picture machine having a driven shaft, a sound recording machine having its drive shaft attached to and in alinement with said driven shaft; a non-vibration-transmitting mounting for the sound recording machine, said mounting consisting of hollow, spherical balls; and a non-vibration-transmitting coupling between the ends of said shafts.

2. In combination with a base, a motion picture machine thereon having a driven shaft; a sound recording machine on said base having its drive shaft attached to and in alinement with said driven shaft; a non-vibration-transmitting coupling between the ends of said shafts; and a non-vibration-transmitting mounting between said base and said sound recording machine, said mounting consisting of hollow, spherical balls.

3. In combination with a base, a motion picture machine thereon having a driven shaft; a sound recording machine on said base having its drive shaft attached to and in alinement with said driven shaft; a non-vibration-transmitting coupling and a clutch between the ends of said shafts; and a non-vibration-transmitting and equally in all directions pressure-resisting mounting between said base and said sound recording machine.

4. An apparatus for producing companion motion pictures and sound records, comprising a base having integral therewith a hollow frame at one end; means between the hollow frame and the other end of the base for pivotally mounting said base; a motion picture machine mounted upon said base between said pivotal means and said last-named end; a non-vibration-transmitting mounting suspended from said base within said hollow frame, said mounting consisting of hollow, spherical balls; a sound recording machine mounted on said mounting; said machines being provided with shafts virtually in alinement with each other; and a non-vibration-transmitting means connecting said shafts for rotating them simultaneously.

5. In an apparatus for producing motion pictures and sound records, comprising a motion picture machine and a sound recording machine having telephonic means for receiving and transmitting sounds to the record thereof; said machines being provided with shafts virtually in alinement with each other; a non-vibration-transmitting coupling between the ends of said shafts for driving said recording machine in synchronism with the motion picture machine; said machines being mounted on bases; one of said bases being suspended over the other; a non-vibration-transmitting mounting between one of said machines and one of said bases, said mounting consisting of hollow, spherical balls; and a pivotal support for the suspending base.

6. An apparatus for controlling the direction of movement for a combined motion picture and sound recording machine consisting of a suspending base and a base suspended therefrom; said suspending base being pivotally mounted; said suspended base having non-vibration-transmitting means for supporting said sound recording machine thereon, said mounting consisting of hollow, spherical balls, said machines being arranged in substantially horizontal alinement with each other; and a non-vibration-transmitting coupling between said machines.

In testimony whereof, I have hereunto set my hand at San Francisco, California, this 12th day of April, 1913.

EDWARD H. AMET.

In presence of—
BALDWIN VALE,
J. B. GARDNER.